United States Patent [19]
Goewey et al.

[11] Patent Number: 5,326,592
[45] Date of Patent: Jul. 5, 1994

[54] ON DIE SOLUTION COATING OF EXTRUDED PROFILES AND APPARATUS THEREFOR

[75] Inventors: James R. Goewey, Marion; Keith E. Wilson, Wabash, both of Ind.

[73] Assignee: GenCorp Inc., Fairlawn, Ohio

[21] Appl. No.: 699,069

[22] Filed: May 13, 1991

[51] Int. Cl.⁵ .................... B05D 5/00; B05C 3/20
[52] U.S. Cl. .......................... 427/256; 427/358; 118/404; 118/411; 264/177.1; 425/461
[58] Field of Search ......... 427/256, 286, 356, 357, 427/358; 118/410, 411, 412, 404, 405; 264/171, 177.1, 177.16, 177.17, 177.18; 425/131.1, 132, 133.5, 462, 461

[56] References Cited

U.S. PATENT DOCUMENTS

| | | | |
|---|---|---|---|
| Re. 30,789 | 11/1981 | Pilgrim et al. | 427/358 |
| 3,155,540 | 11/1964 | Loeffler et al. | 118/314 |
| 3,836,297 | 9/1974 | Weaver | 118/259 |
| 3,841,807 | 10/1974 | Weaver | 118/258 |
| 4,093,414 | 6/1978 | Swiatovy, Jr. | 425/113 |
| 4,263,348 | 4/1981 | Renegar | 118/412 |
| 4,314,872 | 2/1982 | Schiesser | 264/171 |
| 4,623,501 | 11/1986 | Ishizaki | 425/131.1 |
| 4,856,975 | 8/1989 | Gearhart | 425/131.1 |
| 4,883,690 | 11/1989 | Carter | 427/430.1 |
| 4,889,669 | 12/1989 | Suzuki | 425/131.1 |
| 5,087,488 | 2/1992 | Cakmakci | 425/133.5 |

FOREIGN PATENT DOCUMENTS

| | | | |
|---|---|---|---|
| 710069 | 9/1941 | Fed. Rep. of Germany | 118/412 |
| 2200109 | 4/1974 | France | |
| 2572678 | 5/1986 | France | 425/131.1 |
| 60-92821 | 5/1985 | Japan | 264/177.17 |

*Primary Examiner*—Terry J. Owens

[57] ABSTRACT

A coating apparatus and process for coating selected surface areas of extruded substrates with decorative or functional coatings by passing the extruded substrates emerging from the extrusion die through a coating block. The coating block contains a coating cavity die conforming to the selected surfaces to be coated wherein liquid coating is supplied to the coating cavity die in a manner to selectively coat the selected surfaces on the extruded substrate.

18 Claims, 4 Drawing Sheets

ON DIE SOLUTION COATING OF EXTRUDED PROFILES AND APPARATUS THEREFOR

FIELD OF INVENTION

This invention relates to the selective solution coating of extruded surfaces and more particularly to a process and apparatus for selectively coating one or more surfaces of extrudate emerging from an extruder die by providing a solution coating means generally adjacent the extruder die.

BACKGROUND

Various types of extruded articles require surface coatings be applied to a plurality of selected surfaces without coating the entire surface of the extruded article. For instance, extruded elastomeric articles such as automotive window and door seals, fluid hoses, weather stripping and the like are extruded in specific cross-sectional designs which often require selective surface coating of separated surfaces. For example, automotive window seals require special slip- and abrasion-resistant surface coatings adjacent the window for engaging the glass so it can be raised or lowered easily without sticking to the window seal engaging surface. The remaining surfaces are generally maintained free of such coatings.

U.S. Reissue Pat. No. 30,789, relates to a process for coating an inflexible sheet substrate with a relatively thick coating of extruded molten thermoplastic polymer to coat the sheet substrate with a thermoplastic plastic layer to form boards used in construction. The sheet substrate advances in a spaced relationship with the die lip of the applied molten thermoplastic while the advancing sheet substrate forms the second die lip of the extrusion coating die. The sheet substrate ordinarily is wood, although other substrates, e.g., metal or polymeric, can be used. This coating process is not practiced in conjunction with an extruded substrate and utilizes a preformed substrate.

U.S. Pat. Nos. 3,841,807, and 3,836,297, relate to rotating coating application devices in an oscillating relationship with an advancing sheet substrate for depositing two separate coatings on the substrate surface to provide a heat-fused, marbleized plastisol coating on the substrate. This coating application process is not used in conjunction with an extruded substrate.

U.S. Pat. No. 3,155,540, relates to extrusion coating of fabrics by progressively feeding fabric and extruding coating material onto the fabric in a predetermined design and fusing the coating material to the fabric substrate. Similarly, U.S. Pat. No. 4,623,501, pertains to photographic photosensitive materials where photographic emulsions are applied to a belt-like substrate (web) by a coating means having auxiliary coating supply pipes interconnected to the coating application reservoir to prevent the coating from being stagnated within the coating supply cavity prior to applying the coating to the substrate.

U.S. Pat. No. 4,093,414, relates to a single die for co-extruding a high density polyethylene skin layer in a concentric relationship over a cellular polyethylene primary layer where the extruded layers provide cylindrical insulated layers for telephone wires. The two layers of insulating material are applied successively with a melt-flow separator disposed between the insulating layers prior to merging proximate the discharge tip of an extruder for the telephone wire. Similarly, U.S. Pat. No. 4,889,669, relates to a process for extruding two different resin compositions in the form of a laminate through a T-die to produce a foamed thermoplastic article. A similar coextrusion process for thermoplastic articles is disclosed in U.S. Pat. No. 4,856,975, wherein flat articles such as siding are extruded. The coextrusion process is based on a coextrusion block which enables the extruded capstock material to straddle the extruded substrate material.

SUMMARY OF THE INVENTION

The coating apparatus of this invention generally comprises a coating block in conjunction with an extrusion die where protective or functional solution surface coatings are applied to one or more surfaces of the extrudate emerging from the extrusion die. The coating block can be a separate block either attached to the extruder die block, or separate therefrom, or it can also be an integral part of the extruder die as an in-die coating block. Generally, it is a separate block attached to the extruder die. The coating block contains at least one and preferably a plurality of coating reservoirs or chambers, each fitted with an applicator means and adapted to apply surface coatings only onto selected surfaces of the extrudate emerging from the extrusion die. The applicator means supplies at least one liquid solution polymer coating to an in-die coating cavity having surfaces conforming to the selected surfaces of the extruded substrate to be coated. The process of this invention comprises extruding a substrate having designated surface areas to be coated with solution coatings such as polymer or other liquid coatings and coating the designated surface areas as the extrudate emerges from the extrusion die and contacts the coating cavity.

The process and apparatus of this invention can advantageously apply protective or functional solution coatings such as polymer coatings to multiple surfaces generally laterally spaced, vertically displaced, and the like, depending on the cross-sectional configuration of the extruded substrate. The in-die coating process advantageously provides essentially 100 percent transfer efficiency of generally solvent-based coating within the coating block to the selected extrudate surfaces without undesirable solvent emissions. Moreover, general surface areas of the extrudate substrate can be coated without masking. Post-extrusion coating steps displaced from the extruder such as brushing or spraying are thus eliminated. Various protective or functional coatings which can be applied in accordance with the present invention include solution polymer cosmetic or decorative coatings, abrasion resistance or low friction slip coatings, weather-resistant coatings, freeze-resistant coatings and the like. These and other advantages of the invention will become more apparent by referring to the drawings and detailed description of the invention.

DETAILED DESCRIPTION OF THE INVENTION

Figure 1:
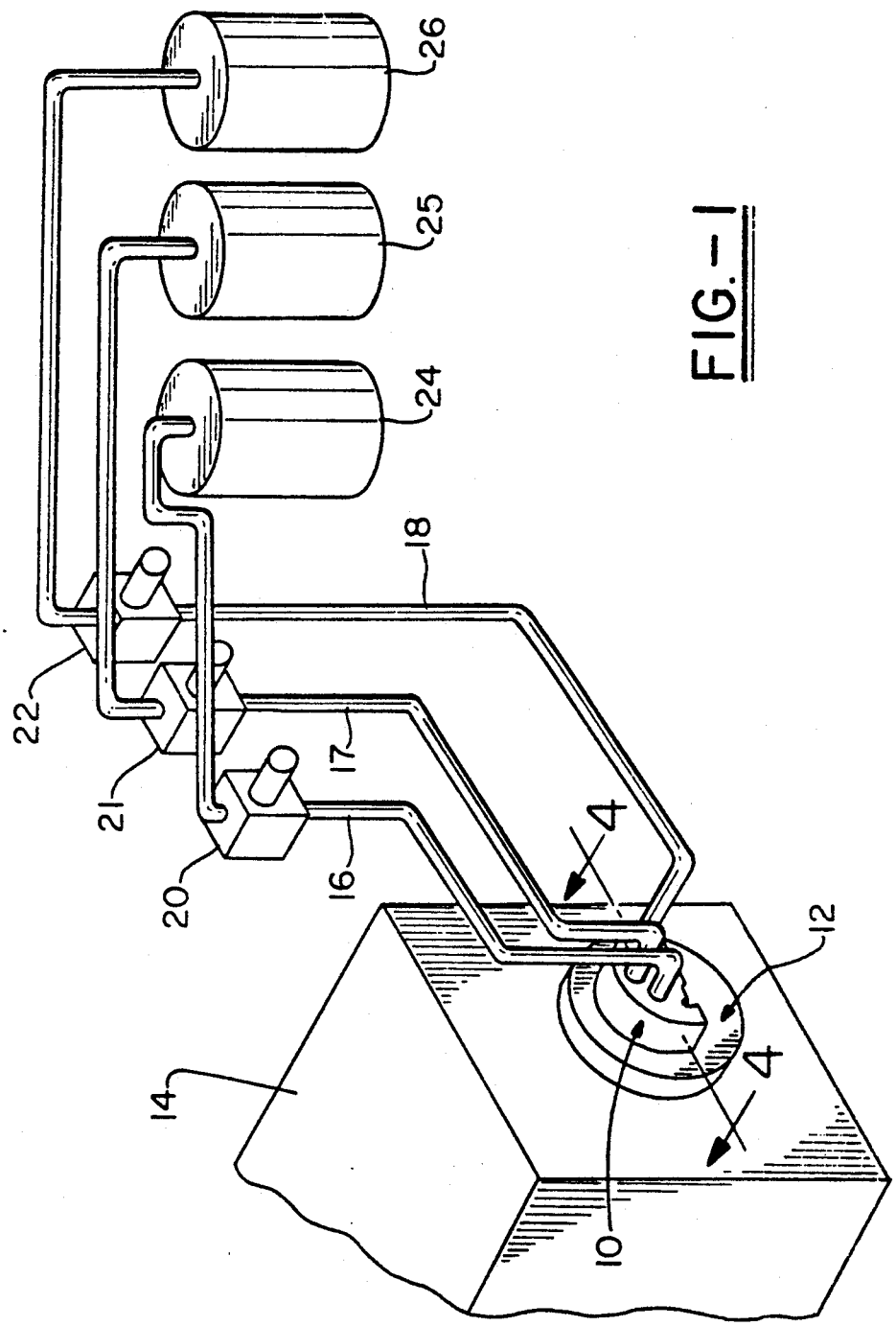
FIG. 1 is a perspective view of the coating apparatus of this invention showing a coating block in conjunction with an extrusion die plate.
Figure 2:
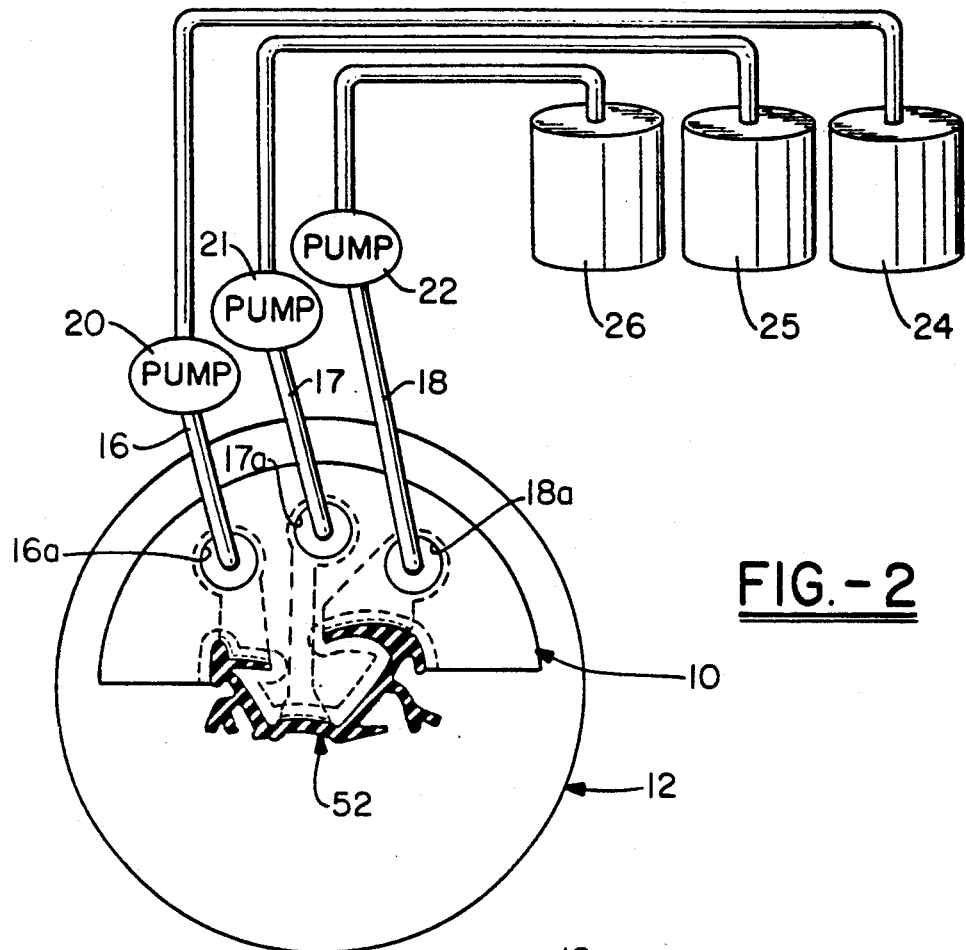
FIG. 2 shows a front view of the extrusion die plate shown in FIG. 1.
Figure 3:
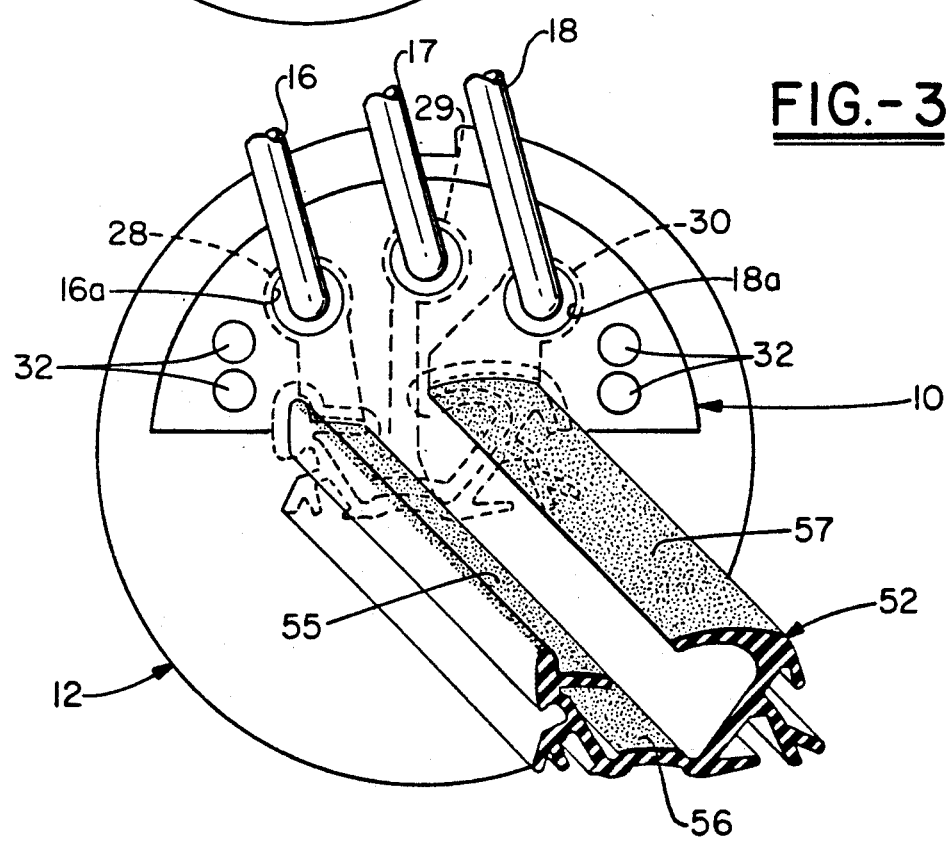
FIG. 3 is an enlarged front elevation view of the coating block shown in FIGS. 1 and 2, and also shows the coated extrudate.

According to the present invention, a coating block 10 is aligned and secured to an extrusion die plate 12 disposed on the front end of an extruder 14. The invention further contemplates the use of one or more coating supply sources which, desirably through individual pumps for each, are connected to specific supply lines. For example, as seen in FIG. 1, a coating block 10 is attached to the extruder die plate 12 and further interconnected to three coating supply pipes 16, 17, 18, and respective pumps 20, 21, 22, and coating supply sources 24, 25, and 26. As seen in FIGS. 2 and 3, the supply pipes 16, 17, 18 are attached to the front surface of the coating block 10 by individual quick-disconnect couplings 28, 29, 30, respectively, to enable simple interconnection with the coating supply sources. The use of three separate supply lines 16, 17, 18 permits use of three different coatings, if desired, and also provides individual control of each coating line where applied pump pressure to each line may be varied if desired to provide varied flow rates and/or applied pressure to form variable applied coating thicknesses to three separate extrudate surfaces. A single coating supply line containing a solution polymer can be used to supply the coating block with its total solution coating supply although separate coating supply lines 16, 17, 18 are preferred.

As seen in FIG. 3, the coating block 10 is secured to the extrusion die plate 12 by a plurality of bolt means 32. The coating block 10 contains a multi-surface coating cavity 35 having the same general cross-sectional configuration as the extrusion die 12. The coating die cavity 35 contains unconnected coating surfaces 38, 40, 42 best viewed in cross-sectional FIG. 4 which particularly shows the coating means for supplying coating to the respective coating surfaces 38, 40, 42. The coating means comprises cylindrical chambers 16a, 17a, 18a disposed in the solid coating block 10 and communicating with coating feed lines 16, 17, 18 respectively. The solution coating such as a polymer coating material is supplied under moderate positive pressure actuated by the individual pumps 20, 21, 22, which can be independently adjusted to supply the coating under pressure to the internal cylindrical chambers 16a, 17a, 18a, as desired.

Figure 4:
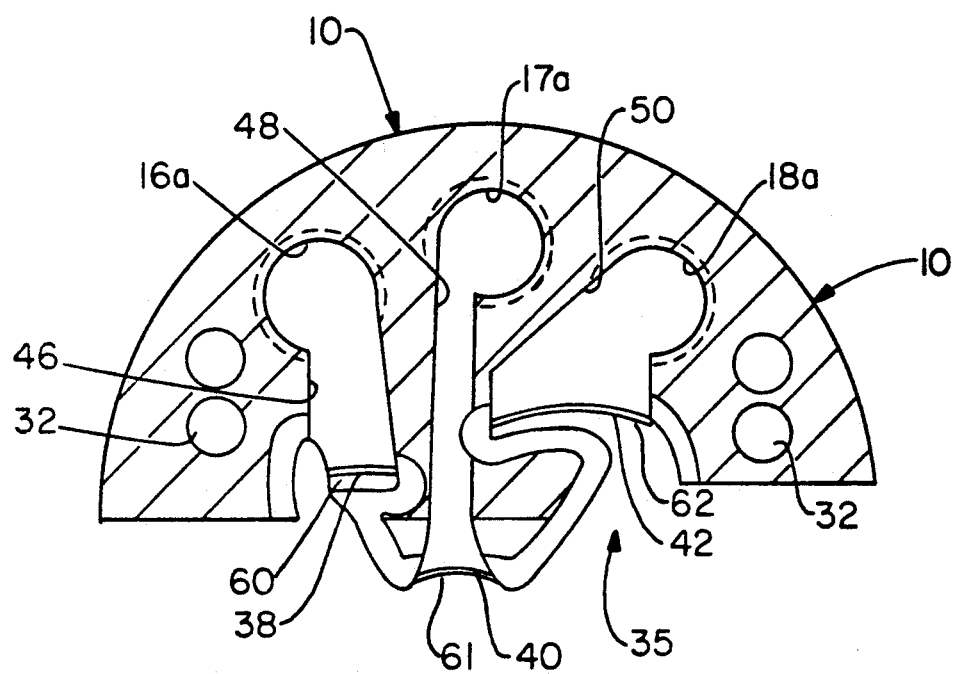
FIG. 4 is an enlarged cross-sectional view taken along lines 4—4 in FIG. 1.
Figure 5:
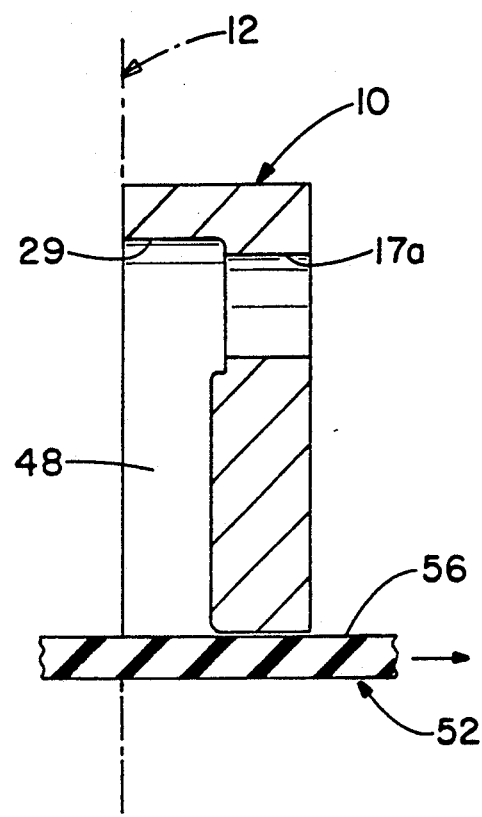
FIG. 5 is a vertical cross-sectional view of the coating block taken through channel 48 of FIG. 4.

As shown in FIG. 4, each individual chamber 16a, 17a, 18a communicates with generally downwardly depending narrow channels 46, 48, 50, respectively, which are generally located in the back of the coating block adjacent the extrusion die 12 and can communicate therewith, terminating in narrow slit applicator openings 60, 61, 62. The slit applicator openings 60, 61, 62 are narrow in depth (i.e., axial height of the coating block), but particularly broad in breadth to accommodate the coating profile breadth desired to be applied to the selected surfaces of the extruded substrate 52. In this regard, internal chamber 18a communicates with a wide profile channel 50 and a wide applicator slit 62 adapted to apply measured amounts of liquid coating to die cavity surface 42 within the coating block 10. Similarly, internal chamber 17a communicates with a narrow profile channel 48 and a narrow applicator slit 61 to supply measured amounts of coating to die cavity surface 40 while internal chamber 16a communicates with an intermediate channel 46 and an intermediate applicator slit 60 to supply measured amounts of liquid coating to die cavity surface 38. The downwardly depending channels 46, 48, 50 are all generally relatively narrow in thickness (depth), but vary in breadth to provide the breadth of coating profile desired. Each internal chamber 16a, 17a, 18a, in conjunction with the respective coating application channels 46, 48, 50, individually functions as flow coating means under minor positive pressure to provide separate linear coatings to separate surface areas. The desired linear coating surfaces can be laterally displaced, or vertically displaced, or both laterally and vertically displaced, as shown in FIG. 4. They furthermore can be of any desired configuration. The applied solution coatings can be continuous or intermittent, as desired, by operatively controlling pumps 20, 21, 22 or other coating supply control means.

The coated extrudate is best seen in FIG. 3, containing linear coatings 55, 56, 57 applied to separate surfaces of the extrudate by liquid coating passing through channels 46, 48, 50, respectively, and through applicator openings 60, 61, 62 to directly apply coatings to the selected surfaces of the extruded substrate 52. The applied solution coatings can be dried or cured at ambient temperatures or heat-cured at elevated temperatures if desired. Preferred coatings are solvent-based polymers and, hence, heat is not required to fuse coatings to extrudate surfaces.

In accordance with this invention, one or more solvent solution coatings can be transported and applied to one or more separate selected surfaces on an extruded substrate. Each coating for each respective selected surface is supplied through a pumping and feed line system to the coating block 10 which, by coating means, applies a coating to a preselected surface of the extrudate in specific metered amounts. Quick-disconnect couplings 28, 29 30 are provided at the coating block as well as being provided at various points in the coating supply lines 16, 17, 18, such as at the pumps 20, 21, 22, or the coating supply sources 24, 25, 26, and permit and facilitate interchange of coating sources with intended coating surfaces, if desired. In order to prevent running on the substrate surface, the solution coating viscosity should be from about 100 to about 500 centipoise, desirably from about 150 to about 500 centipoise, and preferably from about 200 to about 400 centipoise.

The extrudate can be an elastomer, a thermoplastic elastomer, or a thermoset. Useful thermoplastics include polyvinyl chloride, acrylonitrile-butadiene-styrene, various polyolefins made from monomers having from 2 to about 7 carbon atoms with specific examples including polyethylene, polypropylene, etc., or other conventional polymers known to the art and to the literature. Useful thermosets include, for example, polyurethane and various types of rubber such as styrene-butadiene rubber, EPDM rubber (ethylene-propylenediene copolymer), natural rubber, butyl rubber, neoprene, blends of EPDM-SBR and EPDM-neoprene blends, as well as other rubbers known to the art and to the literature. Examples of suitable thermoplastic elastomers include blends of polypropylene and EPDM, e.g., Santoprene®, blends of PVC and EPDM, e.g., Sunprene®, as well as other compounds known to the art and to the literature. The extrudate, be it an elastomer, a thermoplastic elastomer, or a thermoset, can contain suitable reinforcing fibers such as glass, boron, graphite, polyester, nylon, and the like, as well as plastic, or metal reinforcement. The extruded substrate can also be aluminum. EPDM is a preferred substrate.

The solution coatings which can be applied to the extrudate surfaces are generally unlimited so long as they can be dissolved by a suitable solvent known to the art and to the literature, usually organic, or water-based systems, i.e., where water is a solvent, or water-borne systems, i.e., where water is utilized with a co-solvent. An amount of solvent is generally utilized with the desired coating to conform to the above-noted viscosity range of from about 100 to about 500 centipoise. Organic solvents generally include hydrocarbon solvents such as aliphatic hydrocarbons, aromatic hydrocarbons, chlorinated hydrocarbons, aliphatic substituted hydrocarbons, etc., as well as combinations thereof. The useful solution polymer coatings can be cosmetic or decorative coatings to achieve a desired aesthetic effect, or functional surface coatings to impart abrasion resistance, low friction, good weatherability, freeze resistance, and similar functional qualities to the surface coated. Exemplary cosmetic coatings can include polymers such as polyurethanes, polyesters, polyethers, fluorocarbons, silicones, acrylics, vinyls, and the like. Functional coatings include, for example, various polymers such as polyurethanes for high abrasion resistance, polyesters for weatherability, and silicones and Teflon ® polymers for low friction resistance, and the like. Other coatings include flock adhesives, for example nylon or polyester fibers which are electrostatically applied while coating surfaces 55, 56, or 57 are still viscous. In addition to polymer solution coatings, other liquid materials having a suitable non-run viscosity can be utilized such as various lubricants, soaps, paints, and the like, which are known to the art and to the literature.

The type of extruder which can be utilized is not critical and can include a single screw, twin screw, a cross-head extruder, or one or more extruders but only one extrusion die. The extrudate substrate can include a wide variety of extruded articles such as automotive seals for windows or doors, fluid transport hoses, weather stripping, and similar extruded articles which require specifically selected surface coated areas.

In accordance with the process of the present invention, liquid solution coatings such as polymers are supplied to a coating block containing a die cavity 35 having coating surfaces 38, 40, 42 conforming to the selected surfaces on the extruded substrate 52 to be coated. The extruded substrate emerges from the extrusion die plate 12 and enters the coating block 10 where the selected surface on the extruded substrate communicates with the conforming coating surfaces 38, 40, 42, whereupon liquid coating supplied to internal chambers 16a, 17a, 18a discharges through narrow channels 46, 48, 50, respectively. The liquid solution polymer coating passes through applicator openings 60, 61, 62 in the coating die cavity 35, and coating surfaces 38, 40, 42, to directly apply liquid coating as an applied film to the selected surfaces of the extruded substrate.

In accordance with another embodiment of the present invention, coating block 10 need not be attached to extrusion die plate 12, but can be located downstream a sufficient distance so that, for example, the extrudate can be cured to a stable profile, and then reoriented to coat, for example, the area of the part that would normally ride on the curing belt. In addition, it may be desirable to coat a cosmetic or functional coating at the extruder and cure this coating, and downstream apply a flock adhesive and nylon or polyester flock to a different location on the extrudate. This process also eliminates flock contamination of the coating. In this embodiment, the various coatings are applied in the same or similar manner as set forth hereinabove to selected surfaces of the extrudate.

Alternatively, the coating block can actually be a part of the extrusion die and thus contain the same channels 46, 48, 50, coating surfaces 38, 40, and 42, applicator openings 60, 61, 62, and the like, therein.

While the above description relates to a preferred embodiment, it is apparent that the coating block can apply one or more solution coatings via one or more individual supply lines using one or more pumps through one or more coating block channels, each of which can communicate with one or more, but preferably only one, application openings to coat one or more surfaces. It should thus be obvious that the present invention includes a great number of permutations for applying a solution coating to a preselected surface of an extrudate. Another advantage of the present invention is that inasmuch as the coating material is directly applied to a selected extrudate surface, there is no wasted solution coating.

While in accordance with the Patent Statutes, the best mode and preferred embodiment has been set forth, the scope of the invention is not limited thereto, but rather by the scope of the attached claims.

What is claimed is:

1. An apparatus for applying a coating solution to an extruded substrate, comprising:

a coating block abuttingly secured to an extrusion die, said coating block containing at least one coating die cavity opening which conforms to one or more selected surfaces of a polymeric substrate emerging from said extrusion die and at least one coating solution opening, said coating block containing coating means for supplying a liquid solution polymer coating to said coating die cavity opening and to one or more of said selected surfaces of said substrate which surfaces are adjacent to said coating die cavity opening to coat said one or more selected surfaces, said coating means including at least one channel communicating with said coating cavity opening and said coating solution opening, said coating means being located on the back of the coating block adjacent the extrusion die whereby the surface of said extrusion die forms a wall of each said channel, said coating block cooperating with and being adapted to receive extruded substrate from said extrusion die.

2. A coating apparatus according to claim 1, wherein said coating die cavity essentially conforms to the upper surface profile of said extrudate.

3. A coating apparatus according to claim 1, wherein said extrusion die has an upper profile configuration and said coating die cavity conforms to said extrusion die upper profile configuration.

4. A coating apparatus according to claim 2, wherein each channel terminates in a narrow slit opening, and wherein the narrow dimension of each slit is adapted to determine the thickness of the liquid coating applied to said extruded substrate surface.

5. A coating apparatus according to claim 4, wherein said coating means comprises at least two channels.

6. A coating apparatus according to claim 4, wherein each said slit opening has a different breadth and is adapted to deposit a surface coating on said extruded substrate.

7. A coating apparatus according to claim 4, wherein the width of each said slit opening is different to enable each slit opening to apply a different thickness of applied coating to said extruded substrate.

8. A coating apparatus according to claim 1, wherein said coating means is adapted to apply a continuous surface coating on said extrudate substrate.

9. A coating apparatus according to claim 1, wherein said coating means is adapted to be intermittently interrupted to apply a non-continuous linear surface coating on said extruded substrate.

10. A coating apparatus according to claim 5, wherein one of said channels is adapted to deposit continuous linear surface coating and another of the channels is adapted to deposit a discontinuous linear surface coating, each said channel opening having a lateral breadth approximating the intended lateral profile of the applied surface coating to said extruded substrate.

11. A coating apparatus according to claim 10, wherein said coating means is operative to coat in conjunction with said coating die cavity a selected surface of the extruded substrate by applying a measured amount of liquid coating to said extruded substrate.

12. A process for selectively applying a liquid coating to one or more selected surfaces on an extrudate, comprising the steps of:

forming a polymeric extrudate;

selectively coating the one or more selected surfaces of said extrudate as it emerges from an extrusion die by passing said extrudate through a coating block abuttingly secured to the extrusion die, said coating block having at least one coating die cavity opening which conforms to one or more selected surfaces of said polymeric extrudate emerging from said extrusion die and at least one coating solution opening, said coating block containing coating means including at least one channel communicating with said coating cavity opening and said coating solution opening, said coating means being located on the back of the coating block adjacent the extrusion die whereby the surface of said extrusion die forms a wall of each said channel, and supplying said coating die cavity with a liquid solution polymer coating which is applied to said one or more selected surfaces of said extrudate.

13. The process of claim 12, wherein said coating solution is applied continuously on selected surfaces of said extrudate.

14. The process of claim 12, wherein said coating solution is applied intermittently on selected surfaces of said extrudate.

15. The process of claim 12, wherein one of said channels applies a continuous coating to selected surfaces on the extruded substrate and the other said channel applies a coating intermittently on other selected surfaces of said extrudate.

16. The process of claim 12, wherein said coating means applies different thickness of coating to selected surfaces of said extrudate by having narrower or larger discharge openings provided in said channels.

17. An apparatus for solution-coating an extrudate, comprising:

a coating block for applying at least one liquid solution polymer coating to a polymeric extrudate;

said coating block being adapted to be abuttingly secured to an extrusion die and having a coating die cavity opening which conforms to a selected surface of said polymeric extrudate emerging from said extrusion die and having a coating solution opening, said coating block containing coating means including a channel communicating with said coating cavity opening and said coating solution opening, said coating means being located on the back of the coating block adjacent the extrusion die whereby the surface of said extrusion die forms a wall of said channel, said coating block cooperating with and being adapted to receive said extrudate directly from an extrusion die.

18. A solution coating process, comprising the steps of;

extruding a polymeric article through a die plate, providing a coating block abuttingly secured to the die plate and in alignment with said extruded article, said coating block having at least one coating die cavity opening which conforms to one or more selected surfaces of said extruded article emerging from said die plate and having at least one coating solution opening, said coating block containing coating means including at least one channel communicating with said coating cavity opening and said coating solution opening, said coating means being located on the back of the coating block adjacent said die plate whereby the surface of said die plate forms a wall of each said channel, said coating block cooperating with and being adapted to receive said extruded article from said die plate, feeding at least one liquid polymer coating solution to said coating block having said at least one channel therein communicating with a preselected surface of said extruded article to be coated, and applying said at least one liquid polymer coating solution to said preselected surface of said extruded article as it emerges from said die plate.

* * * * *